United States Patent
Monnerat et al.

(10) Patent No.: US 9,989,651 B2
(45) Date of Patent: Jun. 5, 2018

(54) GEOPOSITIONING METHOD WITH TRUST INDEX, AND ASSOCIATED TERMINAL

(71) Applicant: THALES, Courbevoie (FR)

(72) Inventors: Michel Monnerat, Saint-Jean (FR); Damien Serant, Toulouse (FR)

(73) Assignee: THALES, Courbevoie (FR)

( * ) Notice: Subject to any disclaimer, the term of this patent is extended or adjusted under 35 U.S.C. 154(b) by 376 days.

(21) Appl. No.: 14/664,489

(22) Filed: Mar. 20, 2015

(65) Prior Publication Data
US 2015/0268354 A1   Sep. 24, 2015

(30) Foreign Application Priority Data

Mar. 21, 2014 (FR) ..................... 14 00685

(51) Int. Cl.
*G01S 19/20* (2010.01)
*G01S 19/45* (2010.01)
*G01S 19/42* (2010.01)

(52) U.S. Cl.
CPC ............. *G01S 19/45* (2013.01); *G01S 19/20* (2013.01); *G01S 19/425* (2013.01)

(58) Field of Classification Search
CPC ........ G01S 19/45; G01S 19/20; G01S 19/425; G01S 19/23; G01S 19/426; G01S 19/03; G01S 5/0205; G01S 19/10; G01S 19/215; G01S 5/18593; G01C 21/206; H04B 7/18593
USPC ................................................. 342/357.28
See application file for complete search history.

(56) References Cited

U.S. PATENT DOCUMENTS

| | | | | |
|---|---|---|---|---|
| 6,313,786 B1* | 11/2001 | Sheynblat | ............ | G01C 21/206 |
| | | | | 342/357.23 |
| 7,095,368 B1* | 8/2006 | van Diggelen | ......... | G01S 19/23 |
| | | | | 342/357.62 |
| 8,718,673 B2* | 5/2014 | Harper | .................... | G01S 19/03 |
| | | | | 455/456.1 |
| 8,949,941 B2* | 2/2015 | Whelan | ................. | G01S 5/0205 |
| | | | | 455/404.2 |
| 9,201,131 B2* | 12/2015 | Whelan | ............. | H04B 7/18593 |
| 9,217,792 B2* | 12/2015 | Wu | ......................... | G01S 19/10 |
| 2013/0154879 A1* | 6/2013 | Ramakrishnan | ........ | G01S 19/20 |
| | | | | 342/357.25 |

FOREIGN PATENT DOCUMENTS

| | | | | |
|---|---|---|---|---|
| EP | 1965219 | * | 9/2008 | ............... G01S 1/00 |
| EP | 1965219 A1 | * | 9/2008 | ............ G01S 19/08 |
| EP | 1965219 A1 | | 9/2008 | |
| EP | 2037290 A1 | * | 3/2009 | .......... G01C 21/206 |
| EP | 2037290 A1 | * | 3/2009 | .......... G01C 21/206 |
| WO | WO 9802762 | * | 1/1998 | |

(Continued)

*Primary Examiner* — Bernarr E Gregory
*Assistant Examiner* — Nuzhat Pervin
(74) *Attorney, Agent, or Firm* — Baker & Hostetler LLP

(57) ABSTRACT

In the field of satellite geolocation, a geopositioning method with a trust index is implemented by a geopositioning terminal. According to the method, the positioning of the terminal is estimated by geopositioning satellites and the trust index is provided by comparison with at least one pseudo-distance measurement recorded by at least one additional geopositioning satellite, which is different from those used to compute the position of the terminal.

3 Claims, 1 Drawing Sheet

(56) References Cited

FOREIGN PATENT DOCUMENTS

| WO | WO 0045191 A2 | * | 11/2001 | ............. | H04B 7/185 |
| WO | 2007/086894 A1 | | 8/2007 | | |
| WO | WO-2007086894 A2 | * | 8/2007 | ............. | G01S 19/23 |
| WO | WO 2016034623 A1 | * | 3/2016 | ........... | G01S 19/215 |

* cited by examiner

GEOPOSITIONING METHOD WITH TRUST INDEX, AND ASSOCIATED TERMINAL

CROSS-REFERENCE TO RELATED APPLICATION

This application claims priority to foreign French patent application No. FR 1400685, filed on Mar. 21, 2014, the disclosure of which is incorporated by reference in its entirety.

FIELD OF THE INVENTION

The present invention concerns the field of satellite geopositioning. More particularly, the present invention concerns a geopositioning method with a trust index.

BACKGROUND

Satellite geopositioning (or geolocation) devices, referred to by the more complete name of satellite positioning and dating system or by the abbreviation GNSS for Global Navigation Satellite System, compute the position of the reception terminal by measuring the propagation time of the signals transmitted by the positioning satellites between the satellites and the reception terminal. Each geopositioning satellite transmits a coded message containing a certain number of information items, including its own position and the exact instant of transmission of the signal. In order to estimate its position, the geopositioning terminal measures the time that has elapsed between transmission and reception of the coded message and thereby deduces therefrom the distance that separates it from the satellite. Measurements on at least four satellites provide the distances that are necessary for determining the three coordinates of the position, namely latitude, longitude and altitude. This type of measurement is known by the designation "pseudo-distances" in GPS terminology.

In what is known as a constrained environment, that is to say one in which reception conditions for the GNSS signals are not favourable, for example because of multipath problems, masking or interference, the position estimated by the terminal is not always exact and the user has no information about the quality of the computed position.

At present, there is a GNSS augmentation system, or SBAS for Satellite Based Augmentation System, which allows the precision of the GPS (Global Positioning System) to be improved by reducing the margin of error of the system. This augmentation system watches over the GPS system and sends the user information about the quality of the positioning satellites, about the quality of the propagation of the signals and correction values. The aim of these algorithms is to provide the user with a PVT+I (Position, Velocity, Time, Integrity) solution in which the integrity arises from the use of estimation of a quality indicator about the state of the GNSS system, typically about the orbital synchronization of the satellites, but also estimation of the propagation error caused by the ionosphere. Thus, instead of computing his position, the user computes the bubble that he is situated in, that is to say his position plus an estimate of the error that has been made.

A disadvantage of this system is that it has been designed for civil aviation and does not work correctly for a user on the ground. The reason is that on the ground, and notably in an urban environment, there are local propagation phenomena that a system for watching over the GPS constellation cannot anticipate and therefore cannot correct. Among the local propagation phenomena in an urban environment, it is possible to cite masking or multipath phenomena linked to the presence of buildings, for example.

In the prior art, there is equally a RAIM (Receiver Autonomous Integrity Monitoring) algorithm, which is capable of detecting the failure of a geopositioning satellite and of excluding this broken down satellite so that the GPS receiver no longer takes account of the erroneous data that it transmits. The technique involves mixing all of the geopositioning signals that are available for computing a position. By virtue of the measurement redundancy, the algorithm then evaluates the consistency between the various pseudo-distances computed on the basis of the estimated point. The main limitation of this technique is the fact that it requires a large number of measurements. It is therefore not suited to being used in the presence of a high level of masking.

Technologies of "batch" type are likewise known in the prior art, notably from a publication by Mezentsev. These technologies have been developed with the aim of loosely crossing an inertial sensor and a number of GNSS measurements that is too small to compute an instantaneous position. The aim of the technology is therefore to propagate the difference in the position of the user between two instants via the inertial sensor of the geopositioning terminal. This propagation is then used to establish the position, speed and the exact time (PVT for Position, Velocity and precise Time) over all of the pseudo-distances accumulated in the course of time.

A problem arises when the geopositioning terminal 10 is not equipped with an inertial unit.

SUMMARY OF THE INVENTION

The aim of the present invention is to compensate for at least some disadvantages of the prior art by proposing notably a satellite geopositioning method that allows a user to be provided with an indication about the quality of the measurement of an estimated position.

To this end, the invention relates to a geopositioning method with a trust index implemented by a geopositioning terminal, in which the positioning of the terminal is estimated by means of geopositioning satellites and said trust index is provided by comparison with at least one pseudo-distance measurement recorded by means of at least one additional geopositioning satellite, which is different from those used to compute the position of the terminal.

According to an implementation variant, the positioning of the terminal is estimated by means of geopositioning satellites belonging to a first constellation, and the additional satellite(s) belong(s) to a second constellation.

According to an implementation variant, establishment of the trust index comprises:
 a step of estimation of the position of the geopositioning terminal by means of geopositioning satellites,
 a step of recording of a pseudo-distance measurement by means of at least one additional geopositioning satellite, which is different from those used to estimate the position of the terminal,
 a step of computation of the geometric distance between the estimated theoretical position and the position of each additional satellite,
 a step of comparison of the difference ε between at least one recorded pseudo-distance and the corresponding computed geometric distance in relation to a predetermined threshold value.

According to an implementation variant, establishment of the trust index comprises:
 a step of estimation of the initial theoretical position $P_0$ of the geopositioning terminal by means of geopositioning satellites and recording of a pseudo-distance measurement by means of an additional geopositioning satellite, which is different from those used to estimate the position of the terminal,
 for at least three different positions of the terminal:
  a step of estimation of the theoretical position of the geopositioning terminal by means of geopositioning satellites,
  a step of recording of a pseudo-distance measurement by means of the same additional geopositioning satellite as that used at the instant t,
  a step of computation of the position difference $\Delta_P$ in relation to the initial position $P_0$,
  a step of modification of the pseudo-distance measurement, by means of the computed position difference $\Delta_P$, to produce a measurement d' that would have been performed at the initial position $P_0$,
 a step of position computation by means of the pseudo-distance measurement recorded at the initial position and the at least three measurements d',
 a step of comparison of the difference between the theoretical position $P_0$ estimated by means of the geopositioning satellites and the position computed by means of the pseudo-distance measurements in relation to a predetermined threshold value.

According to an implementation variant, the geopositioning terminal is devoid of an inertial unit.

The invention also relates to a geopositioning terminal comprising at least one computation module configured to implement the method defined above.

BRIEF DESCRIPTION OF THE DRAWINGS

Other characteristics and advantages of the present invention will emerge more clearly upon reading the description below, which is provided by way of illustration and without limitation and written with reference to the appended drawing, in which.

DETAILED DESCRIPTION

The present invention relates to a satellite positioning method with a trust index. The principle of the invention involves estimation of a position by means of the signals broadcast by geopositioning satellites visible from the geopositioning terminal and then use of a pseudo-distance measurement from a satellite that is not used for position computation in order to obtain a piece of information about the precision of the position measurement performed. Subsequently, this information about the precision will be called a "trust index".

Of course, in order to refine the trust index, a greater number of pseudo-distance measurements may be used.

According to one mode of implementation, the satellite(s) used to establish the trust index may be part of a different constellation from that used to estimate the position of the geopositioning terminal. According to an example that is by no means limiting, the first constellation for estimating the theoretical position may be the GPS system and the second constellation allowing the degree of trust to be established may be the Galileo, GLONASS or IRNSS system or any other equivalent satellite positioning system. Of course, any combination of these constellations is possible.

Figure 1:
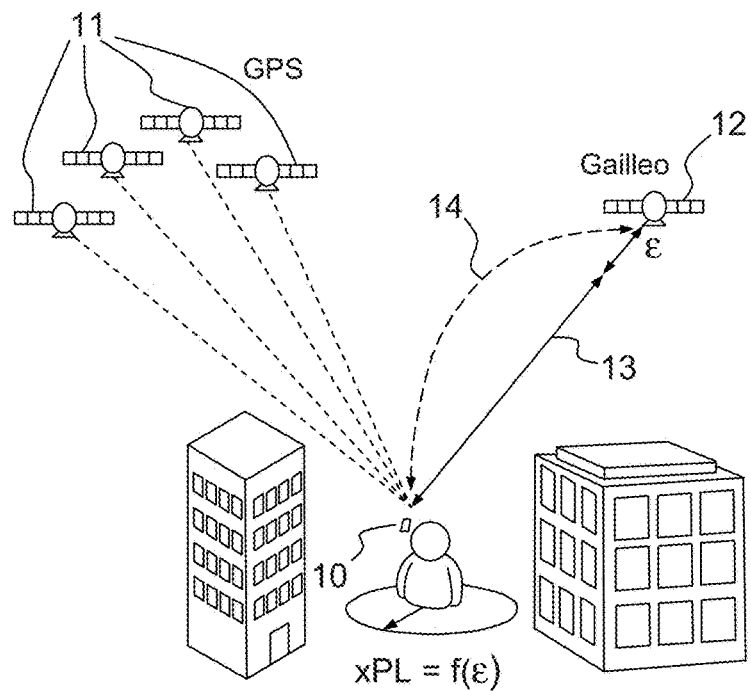
FIG. 1 illustrates a first implementation example for the method according to the invention.

With reference to FIG. 1, a first mode of implementation will be presented.

The method according to the invention can comprise a step of estimation of the position of the geopositioning terminal 10 by means of geopositioning satellites 11, a step of recording of a pseudo-distance 13 measurement by means of at least one additional geopositioning satellite 12, which is different from those used to estimate the position of the geopositioning terminal 10, a step of computation of the geometric distance between the estimated theoretical position and the position of each additional satellite 12 and a step of comparison of the difference between at least one recorded pseudo-distance and the corresponding computed geometric distance in relation to a predetermined threshold value.

As is known, the estimation of the theoretical position of the geopositioning terminal 10 can be obtained by demodulating the signals from at least four geopositioning satellites 11 that are visible from the terminal 10.

In order to validate the theoretical position obtained and obtain a trust index about the estimation of the position, the geopositioning terminal 10 demodulates the signals transmitted by at least one satellite 12 that is different from those that have been used to estimate the theoretical position so as to obtain a pseudo-distance 13 measurement.

Knowing the position of the additional geopositioning satellite 12, the geopositioning terminal 10 can compute the geometric distance between the estimated theoretical position of the terminal 10 and the additional geopositioning satellite 12.

If a plurality of additional measurements have been recorded, the geopositioning terminal 10 will measure as much geometric distance 14 as pseudo-distance 13 measurements that have been recorded.

The pseudo-distance 13 measurement is then compared with the computed geometric measurement 14. If the computed geometric distance 14 is different from the recorded pseudo-distance 13, the geopositioning terminal 10 can estimate the position error ε by computing the difference between these two measurements. The error ε is then compared with a predetermined threshold value. If the measured error ε is higher than the predetermined threshold, the trust index will be considered poor, otherwise this index will be considered acceptable.

If the additional geopositioning satellite 12 belongs to a different constellation from the one that has been used to establish the theoretical position, so as to compare the computed geometric distance 14 and the recorded pseudo-distance 13, a correction will be made to the pseudo-distance 13 measurement so as to take account of the time offset between the two constellations. By way of example, when the GPS system and the Galileo system are used, this time offset is provided by the GGTO (GPS Galileo Time Offset) signal.

On the basis of the error ε, the terminal can compute an estimate of the standard deviation over the position error xPL, known by the term "protection level". Thus, the geopositioning terminal 10 estimates the coordinates of a point corresponding to its position and, on the basis of the position error ε, determines the circular area 15 in which the user is situated.

Figure 2:
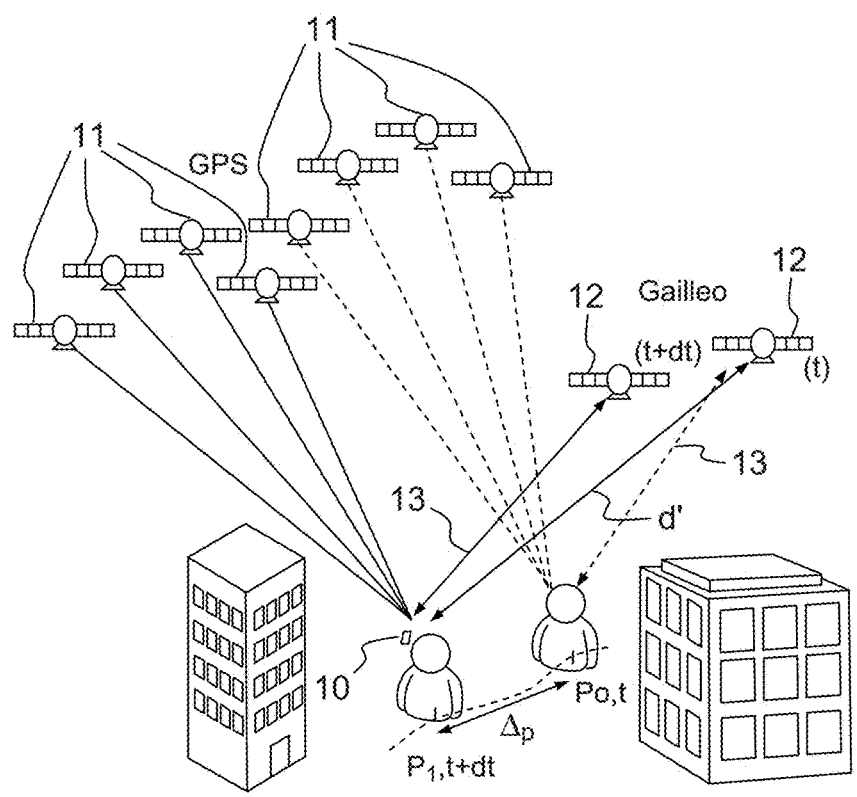
FIG. 2 illustrates an example of a second mode of implementation of the method according to the invention for two different positions of the user.

With reference to FIG. 2, a second mode of implementation is presented. This second implementation corresponds to a dynamic mode.

The method according to the invention attempts to provide a solution when the user is moving and his geopositioning terminal 10 is devoid of an inertial unit. Of course, the method proposed can likewise be implemented by a terminal having an inertial unit.

The principle of the invention will involve the use of at least four geopositioning satellites 11 to estimate the various positions of the terminal 10 of the user during movement, and thus to propagate the position of said user. At least one additional satellite 12, which is different from those used to estimate the position of the geopositioning terminal 10, will be used to record pseudo-distance 13 measurements while the user is moving.

This mode of implementation can comprise a step of estimation of the initial theoretical position $P_0$ of the geopositioning terminal 10 by means of geopositioning satellites 11 and the recording of a pseudo-distance 13 measurement by means of an additional geopositioning satellite 12, which is different from those used to estimate the position of the terminal 10.

For at least three additional positions of the terminal, the method can, moreover, comprise a step of estimation of the theoretical position of the geopositioning terminal 10 by means of geopositioning satellites 11, a step of recording of a pseudo-distance 13 measurement by means of the same additional geopositioning satellite 12 as that used at the instant t, a step of computation of the position difference $\Delta_P$ in relation to the initial position $P_0$ and a step of modification of the pseudo-distance 13 measurement, by means of the computed position difference $\Delta_P$, to produce a measurement d' that would have been performed at the initial position $P_0$.

The method can then comprise a step of position computation by means of the pseudo-distance measurement recorded at the initial position and the at least three measurements d' and a step of comparison of the difference between the theoretical position $P_0$ estimated by means of the geopositioning satellites 11 and the position computed by means of the pseudo-distance measurements in relation to a predetermined threshold value.

With reference to FIG. 2, an instant t and an initial position $P_0$ of the user and hence of the geopositioning terminal 10 will be considered. As before, the geopositioning terminal 10 computes its theoretical position $P_0$ by demodulating the signals from at least four geopositioning satellites 11. The terminal 10 then records a pseudo-distance 13 measurement $d_0$ by means of an additional satellite 12, which is different from those that have been used to compute the theoretical position. Two measurements are stored, for example in a memory area of the geopositioning terminal 10.

While the user is moving, at the instant t+dt, the geopositioning terminal 10 estimates its new theoretical position $P_1$. The terminal 10 can thus compute the position difference $\Delta_P$ between the new position $P_1$ and the initial position $P_0$.

At the instant t+dt, the terminal 10 likewise records the pseudo-distance 13 measurement $d_1$ by means of the same additional satellite 12 as at the instant t. By virtue of the computed position difference $\Delta_P$, the terminal 10 can take back this new pseudo-distance 13 measurement $d_1$ to a measurement $d'_1$ that would have been performed at the position $P_0$.

While the user is moving, the additional satellite 12 has likewise moved to a new position that is known to the geopositioning terminal 10. Recording the pseudo-distance measurement $d_1$ back to a measurement $d'_1$ that would have been performed at the position $P_0$ amounts to acting as if the user had not moved and only the additional geopositioning satellite 12 had moved. This amounts to considering a user who had to record a second pseudo-distance measurement towards a virtual geopositioning satellite to be static.

If this operation is repeated at least twice, at least four pseudo-distance measurements towards virtual satellites are obtained, and it is thus possible to compute the coordinates of the initial position $P_0$.

This position is then compared with the theoretical position $P_0$ estimated at the instant t. If the gap between the two measurements is greater than a predetermined threshold, the trust index is considered poor. Otherwise, this index is considered acceptable.

In this second mode of implementation of the method according to the invention, a group of fictional geopositioning satellites is synthesized with a single geopositioning satellite 12 so as to be able to compute a position.

The present invention likewise relates to a satellite geolocation terminal 10 that is capable of implementing the method according to the invention. This terminal can have at least one reception module that is capable of receiving at least one electromagnetic signal transmitted by geolocation satellites 11, 12, at least one computation module and at least one memory area. The computation module can comprise a processor configured or programmed to implement the method according to the invention.

According to one particular embodiment, the geopositioning terminal 10 implementing the method according to the invention can comprise an inertial unit.

The invention claimed is:

1. A geopositioning method with a trust index implemented by a geopositioning terminal comprising a receiver unit and a computing unit, said geopositioning terminal being configured to measure pseudo-distances of a plurality of geopositioning satellites using signals transmitted by the geopositioning satellites and received by the receiver unit, to estimate its position, at a given instant, using the pseudo-distances measured for said given instant and to measure and record, for said given instant, the pseudo-distance of at least one additional geopositioning satellite using a signal transmitted by the additional geopositioning satellite and received by the receiver unit; said positioning method comprising:

a first estimation step comprising:
   the geopositioning terminal estimating at a given instant t its initial theoretical position ($P_0$) using geopositioning satellites of the plurality of geopositioning satellites and recording a pseudo-distance measurement by means of the same additional geopositioning satellite as that used at the given instant t, which is different from those used to estimate the position of the geopositioning terminal, a second step of determining a trust index, said step comprising, for at least three different positions of the geopositioning terminal at three different instants:
   the geopositioning terminal estimating its theoretical position by means of the geopositioning satellites,
   the geopositioning terminal recording a pseudo-distance measurement by means of the same additional geopositioning satellite as that used at the instant t,
   the computing unit computing the position difference ($\Delta P$) in relation to the initial position ($P_0$) of the geopositioning terminal,
   the computing unit modifying the pseudo-distance measurement using the computed position difference ($\Delta P$), to produce a measurement (d') corresponding to the pseudo-distance that would have been performed at the initial theoretical position ($P_0$) for the considered instant,
- a third step comprising the computing unit computing the position of the geopositioning terminal at said given instant t by means of the pseudo-distance measurement recorded at the initial theoretical position ($P_0$) and the at least three measurements (d'),
- a fourth step comprising the computing unit comparing to a predetermined threshold value the difference between the theoretical position ($P_0$) estimated using the geopositioning satellites and the position computed by means of the pseudo-distance measurements, the result of the comparison constituting the trust index, and
- a fifth step comprising the geopositioning terminal providing the estimated position ($P_0$) of the geopositioning terminal for the given instant t and the associated trust index.

2. The method according to claim 1, in which the geopositioning terminal is devoid of an inertial unit.

3. The geopositioning method according to claim 1, wherein the geopositioning terminal estimates its theoretical position using geopositioning satellites belonging to a first constellation, whereas the at least one additional satellite belongs to a second constellation.

\* \* \* \* \*